United States Patent
Geetla et al.

(10) Patent No.: US 10,656,032 B2
(45) Date of Patent: May 19, 2020

(54) TEMPERATURE SENSOR IN AN INTEGRATED CIRCUIT AND METHOD OF CALIBRATING THE TEMPERATURE SENSOR

(71) Applicant: NXP USA, Inc., Austin, TX (US)

(72) Inventors: Ravichandar Reddy Geetla, Austin, TX (US); Chang Joon Park, Austin, TX (US); Charles Eric Seaberg, Austin, TX (US); Octavio A. Gonzalez, Pflugerville, TX (US)

(73) Assignee: NXP USA, Inc., Austin, TX (US)

( * ) Notice: Subject to any disclaimer, the term of this patent is extended or adjusted under 35 U.S.C. 154(b) by 493 days.

(21) Appl. No.: 15/471,021

(22) Filed: Mar. 28, 2017

(65) Prior Publication Data

US 2018/0283963 A1    Oct. 4, 2018

(51) Int. Cl.
    G01K 7/00       (2006.01)
    G01K 15/00      (2006.01)
    G01K 7/01       (2006.01)

(52) U.S. Cl.
    CPC ............. *G01K 15/005* (2013.01); *G01K 7/01* (2013.01); *G01K 2219/00* (2013.01)

(58) Field of Classification Search
    USPC ..................... 374/184, 170, 1, 163
    See application file for complete search history.

(56) References Cited

U.S. PATENT DOCUMENTS

| 3,710,374 A | 1/1973 | Kelly |
| 6,346,907 B1 | 2/2002 | Dacy et al. |
| 7,924,207 B2 | 4/2011 | Snoeij et al. |
| 2013/0335135 A1* | 12/2013 | Chen .................. H04L 25/0272 327/509 |
| 2015/0268103 A1* | 9/2015 | Wu ....................... G01K 1/024 374/1 |

* cited by examiner

*Primary Examiner* — Mirellys Jagan

(57) ABSTRACT

A temperature sensor configured to, after a predetermined number of stop counting assertions, determine the temperature dependent voltage and thus the temperature at the output of a counter. During a calibration phase, when a counter value is not equal to a test counter value in a pulse generator circuit, capacitance of the temperature sensor is adjusted until the counter value is equal to the test counter value.

13 Claims, 3 Drawing Sheets

TEMPERATURE SENSOR IN AN INTEGRATED CIRCUIT AND METHOD OF CALIBRATING THE TEMPERATURE SENSOR

BACKGROUND

Field

This disclosure relates generally to temperature sensors, and more specifically, to a temperature sensor within an integrated circuit and a method of calibrating the temperature sensor.

Related Art

Within integrated circuits, localized high temperature areas can be created due to, for example, high switching events. These localized high temperature areas can be referred to as hot spots and can cause significant reliability and robustness issues with the integrated circuit. Therefore, a need exists for accurate temperature sensing.

One temperature sensing circuitry available today uses a base-emitter voltage of a bipolar device and a single slope ramp based time-to-digital converter to provide precise temperature sensing. However, this single slope ramp method requires a very fast clock that is not available on every integrated circuit for the temperature sensing circuit.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A temperature sensing circuit senses a temperature dependent voltage and provides a digital value indicative of the sensed temperature. In one embodiment, the temperature sensing circuit uses comparisons with twin $1^{st}$-order temperature independent single slope ramp voltage references and a digital counter for a time-to-digital conversion (TDC). The ramp slopes can be calibrated with a calibration scheme using a known test voltage and programmable capacitors and bias currents. The use of such programmable capacitors and programmable bias currents may minimize errors due to process-voltage-temperature (PVT) variations.

A temperature dependent voltage is provided as Vtemp to the temperature sensing circuit. In one embodiment, this temperature dependent voltage is provided by the base-emitter voltage (Vbe) of a diode-connected bipolar device. The voltage Vbe varies linearly with temperature. In alternate embodiments, Vtemp can be provided by other temperature dependent devices or circuits.

Figure 1:
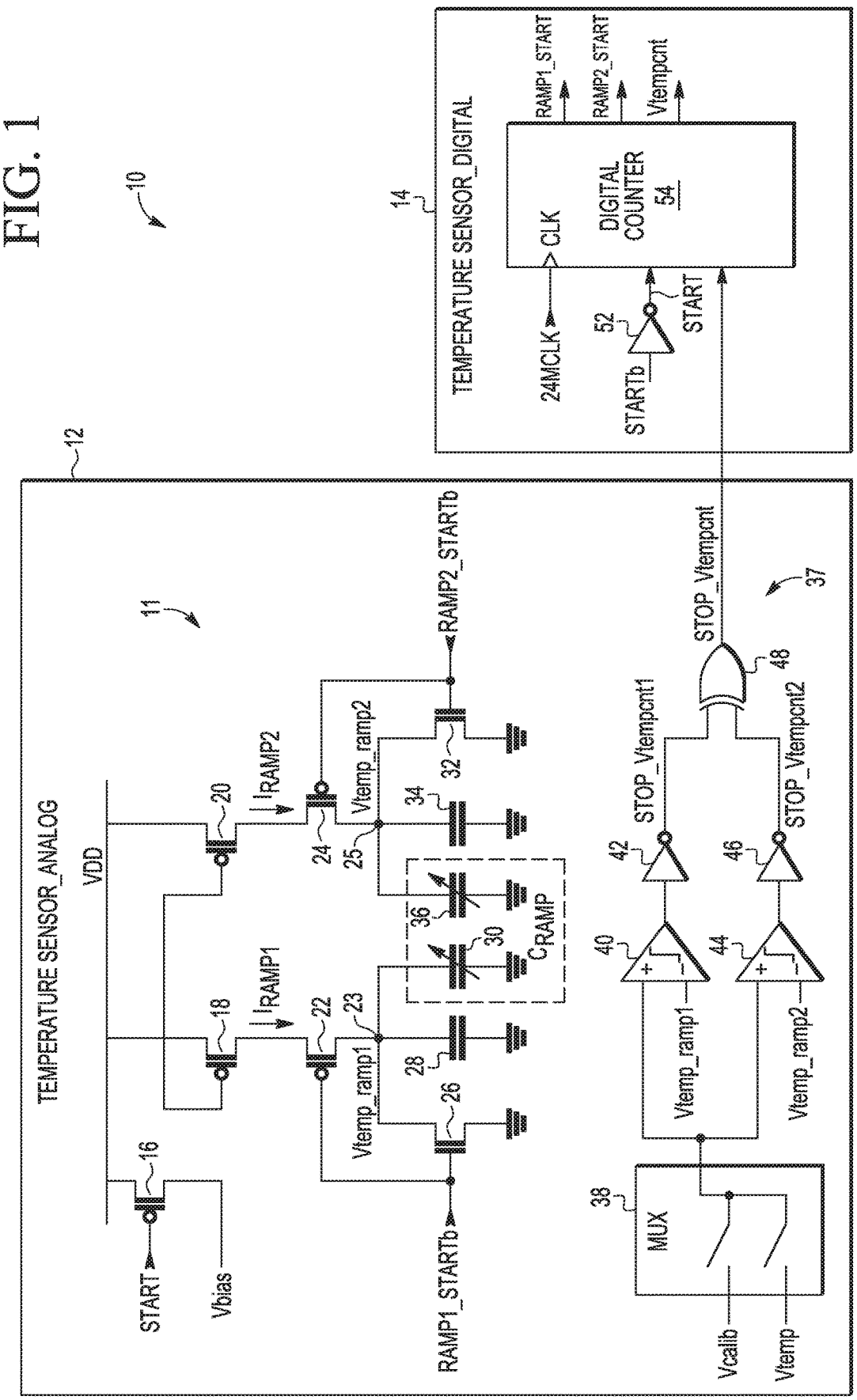
FIG. 1 illustrates, in partial schematic and partial block diagram form, a temperature sensor in accordance with one embodiment of the present invention.

FIG. 1 illustrates, in partial block diagram form and partial schematic form, a temperature sensing circuit 10 (also referred to as a temperature sensor). Temperature sensing circuit includes an analog portion 12 and a digital portion 14. Analog portion 12 includes ramp generation circuitry 11 and comparison circuitry 37 (which may also be referred to as pulse generating circuitry). Digital portion 14 includes digital counter 54.

Ramp generation circuitry 11 includes p-type transistors 16, 18, 20, 22, and 24, n-type transistors 26 and 32, capacitors 28 and 34 (which may be any type of capacitive element), and programmable capacitors 30 and 36 (also referred to as tunable capacitors). Transistor 16 has a first current electrode coupled to a first supply voltage (e.g. VDD), a control electrode (i.e. a gate electrode) coupled to receive a START signal. Transistor 18 has a first current electrode coupled to the first supply voltage and a control electrode (i.e. control gate) coupled to receive a bias voltage, Vbias. Transistor 22 has a first current electrode coupled to a second current electrode of transistor 18, a control electrode coupled to receive a RAMP1_STARTb signal (which is the inverse or complement of a RAMP1_START signal), and a second current electrode coupled to a first circuit node 23. Transistor 26 has a first current electrode coupled to node 23, a control electrode coupled to receive RAMP1_STARTb, and a second current electrode coupled to a second supply voltage (e.g. ground, depicted with the ground symbol). Capacitor 28 has a first terminal coupled to node 23 and a second terminal coupled to the second supply voltage. Programmable capacitor 30 has a first terminal coupled to node 23 and a second terminal coupled to the second supply voltage. Transistor 20 has a first current electrode coupled to the first supply voltage and a control electrode (i.e. control gate) coupled to receive Vbias. Transistor 24 has a first current electrode coupled to a second current electrode of transistor 20, a control electrode coupled to receive a RAMP2_STARTb signal (which is the inverse or complement of a RAMP2_START signal), and a second current electrode coupled to a second circuit node 25. Transistor 32 has a first current electrode coupled to node 25, a control electrode coupled to receive RAMP2_STARTb, and a second current electrode coupled to the second supply voltage. Capacitor 34 has a first terminal coupled to node 25 and a second terminal coupled to the second supply voltage. Programmable capacitor 36 has a first terminal coupled to node 25 and a second terminal coupled to the second supply voltage. Node 23 provides Vtemp_ramp1 and node 25 provides Vtemp_ramp2.

Comparison circuitry 37 is coupled to receive Vtemp and a calibration voltage, Vcalib, and is coupled to each of nodes 23 and 25, and provides a signal Stop_Vtempcnt to counter 54. Comparison circuitry 37 includes a multiplexer (MUX) 38, comparators 40 and 44, inverters 42 and 46, and XOR gate 48. MUX 38 receives Vcalib at a first input and Vtemp at a second input, and has an output coupled to non-inverting inputs of each of comparators 40 and 44. An inverting input of comparator 40 is coupled to node 23 and thus receives Vtemp_ramp1, and an inverting input of comparator 44 is coupled to node 25 and thus receives Vtemp_ramp2. An output of comparator 40 is coupled to an input of inverter 42, and an output of inverter 42 is coupled to provide Stop_Vtempcnt1 to a first input of XOR 48. An output of comparator 44 is coupled to an input of inverter 46, and an output of inverter 46 is coupled to provide Stop_Vtempcnt2 to a second input of XOR 48. An output of XOR 48 provides Stop_Vtempcnt to digital counter 54. Comparators 40 and 44 and XOR 48 operate as pulse generation circuitry which generates pulses based on comparisons of Vtemp with each of Vtemp_ramp1 and Vtemp_ramp2.

Digital counter 54 has a clock input to receive an accurate, on-chip clock. In one embodiment, this on-chip clock is provided by a crystal which ensures its accuracy. In the current embodiment, it will be assumed that this clock has a frequency of 24 MHz, and therefore will be referred to as 24Mclk. However, in alternate embodiments, other clock frequencies may be used. Inverter 52 receives STARTb and provides START to digital counter 54. Digital counter 54 receives Stop_Vtempcnt, and provides RAMP1_START, RAMP_START, and Vtempcnt. When START is asserted, counter 54 begins counting clock cycles (e.g. rising edges) of 24MClk. Once counter 54 has received a predetermined number, y, of pulses (e.g. rising edges) on Stop_Vtempcnt, START is negated (i.e. de-asserted) and the output, Vtempcnt, provides a count of the number of cycles of 24MClk which occurred within the time period defined by the y pulses of Stop_Vtempcnt. In the illustrated embodiment, y=32 such that counter 54 is set to count the number of cycles of 24MClk which occur in the time period defined by 32 pulses of Stop_Vtempcnt. Also, each time a pulse on Stop_Vtempcnt is received, RAMP1_START and RAMP2_START are alternately asserted and negated (i.e. de-asserted). For example, when START is asserted, RAMP1_START is asserted (set to a logic level 1) and RAMP2_START is negated (cleared to a logic level 0). Upon receiving an initial pulse of Stop_Vtempcnt, RAMP1_START is negated and RAMP2_START is asserted. Then upon receiving a subsequent pulse of Stop_Vtempcnt, RAMP1_START is again asserted and RAMP2_START is again negated. This continues until START is negated. Operation will be described further in reference to FIG. 2 below. Note that negative logic rather than positive logic may be used for any of the signals. For example, rather than detecting or counting rising edges, counter 54 may detect or count falling edges.

Figure 2:
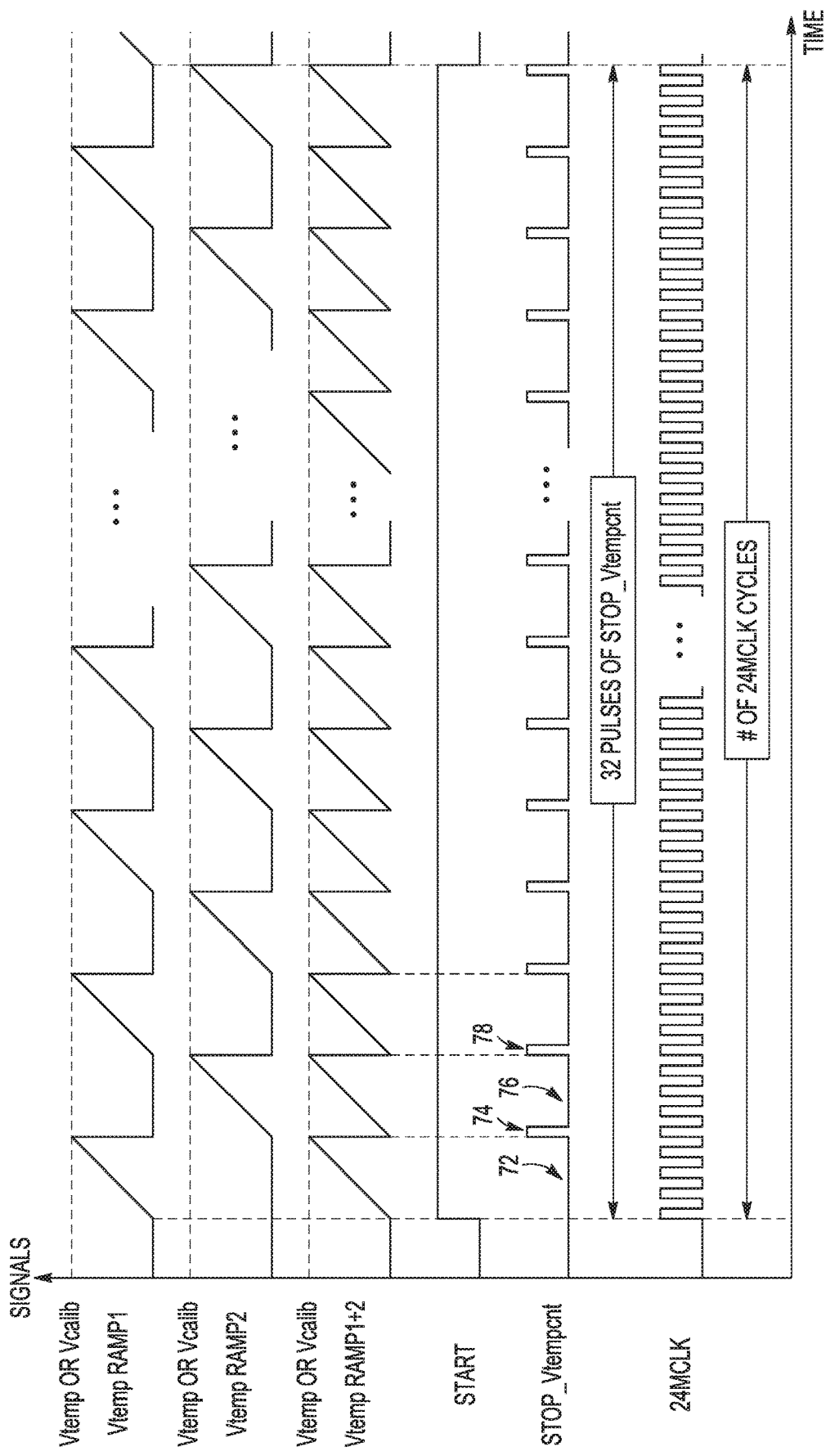
FIG. 2 illustrates, in timing diagram form, various signals in the temperature sensor of FIG. 2, in accordance with one embodiment of the present invention.

In operation, ramp generation circuitry 11 alternately generates twin voltage ramp slopes, offset in time, at nodes 23 and 25, respectively, in which the slope of each ramp is determined by current (I)/capacitance (C). For example, as seen in FIG. 2, Vtemp_ramp1 at node 23 ramps up with a predetermined slope while Vtemp_ramp2 is at 0, and then Vtemp_ramp2 at node 25 ramps up with a predetermined slope while Vtemp_ramp1 is at 0. Vtemp_ramp1 and Vtemp_ramp2 alternate with one ramping (i.e. being enabled) while the other is held at ground. Transistors 18 and 20 operate as current sources which provide a current Iramp1 and Iramp2, respectively, based on Vbias. Therefore, Vbias provides for programmable currents Iramp1 and Iramp2 in which the values of Iramp1 and Iramp2 can be set by Vbias.

Iramp1 is directed down through capacitors 28 and 30 by transistor 22, when enabled (i.e. turned on), and Iramp2 is directed down through capacitors 34 and 36 by transistor 24, when enabled (i.e. turned on). Therefore, when transistor 22 is enabled, Iramp1 charges capacitors 28 and 30, resulting in Vtemp_ramp1 at node 23. The slope of Vtemp_ramp1 is determined by Iramp1/$C_{28,30}$, in which $C_{28,30}$ is the sum of the capacitance of capacitors 28 and 30. When transistor 22 is on, transistor 26 is off. However, when transistor 22 is off, transistor 26 is on, pulling node 23 to ground. This resets the voltage across capacitors 28 and 30. Likewise, when transistor 24 is enabled, Iramp2 charges capacitors 34 and 36, resulting in Vtemp_ramp2 at node 25. The slope of Vtemp_ramp2 is determined by Iramp2/$C_{34,36}$, in which $C_{34,36}$ is the sum of the capacitance of capacitors 34 and 36. When transistor 24 is on, transistor 32 is off. However, when transistor 24 is off, transistor 32 is on, pulling node 25 to ground. This resets the voltage across capacitors 34 and 36. Note that ramp generation circuitry 11 is enabled or started by assertion of START. This turns off transistor 16 so that VDD is no longer coupled to the control electrodes of transistors 18 and 20, thus allowing transistors 18 and 20 to be controlled by Vbias.

Comparison circuitry 37 generates pulses based on Vtemp_ramp1 and Vtemp_ramp2 hitting a voltage level selected by MUX 38. When MUX 38 selects Vtemp (during an operational phase), the pulses are generated based on Vtemp_ramp1 and Vtemp_ramp2 hitting Vtemp. The voltage, Vtemp, is a temperature dependent voltage in that it changes in relationship with temperature. For example, Vtemp may correspond to a base-emitter voltage (Vbe) of a diode-connected Bipolar Junction Transistor (BJT), where the Vbe varies with temperature. Other temperature dependent voltages may be used. During normal operation (as opposed to calibration, which will be discussed below), MUX 38 selects Vtemp. Comparator 40 compares Vtemp_ramp1 with Vtemp, and comparator 44 compares Vtemp_ramp2 with Vtemp. With respect to each of comparators 40 and 44, so long as the inverting input is lower than the non-inverting input, the output of the comparator is high (e.g. a logic level 1). However, when the inverting input matches or surpasses the non-inverting input, the output of the comparator goes low (e.g. a logic level 0).

FIG. 2 illustrates, in timing diagram form, various signals of temperature sensor 10. Operation of FIG. 1 will be described in combination with the timing diagram of FIG. 2. Therefore, referring to comparator 40, the output is initially high (since Vtemp_ramp1 starts at 0 after having been reset) and remains high until Vtemp_ramp1 reaches Vtemp. At this point, the output of comparator 40 goes low and the output of inverter 42, Stop_Vtempcnt1, goes high at the first input of XOR 48. While Vtemp_ramp1 is ramping, Vtemp_ramp2 is held at ground, therefore, the output of comparator 44 is also 1. The output of inverter 46, Stop_Vtempcnt2, is 0. At the beginning of either Vtemp_ramp1 or Vtamp_ramp2, the inputs to XOR 48 are 0, and therefore, the output of XOR 48, Vtempcnt, is 0, as can be seen at point 72 on FIG. 2. Assuming Vtemp_ramp1 is enabled, when Vtemp_ramp1 reaches Vtemp, the output of comparator 40 goes low and the output of inverter 42 goes high. At this point, the output of XOR 48 changes state and becomes a 1, as seen at point 74 on FIG. 2.

Each time the output of XOR 48 goes high (e.g. with each rising edge of Stop_Vtempcnt), counter 54 alternately asserts and negates RAMP1_START and RAMP2_START, as described above. That is, when a rising edge of Stop_Vtempcnt is received by counter 54, counter 54 negates the start signal of the currently enabled ramp, RAMP1_START for this example, and asserts the start signal for the other ramp, RAMP2_START for this example. Therefore, RAMP1_STARTb goes high and pulls node 23 to ground, and RAMP2_STARTb goes low, turning on transistor 24 and enabling ramp2. With node 23 pulled to ground and ramp2 beginning at 0, the outputs of comparators 40 and 44 are 1, with the output of XOR 48 being 0, as seen at point 76 on FIG. 2. This time, when Vtemp_ramp2 reaches Vtemp, the output of comparator 44 goes low, causing the output of XOR 48 to go high, as seen at point 78 of FIG. 2. This results in another rising edge (another pulse) on Stop_Vtempcnt. This alternating of ramps continues until counter 54 counts 32 pulses of Stop_Vtempcnt. When 32 pulses of Stop_Vtempcnt has occurred, START is negated and the output of counter 54, Vtempcnt, provides the count of how many 24MClk pulses occurred during the count of 32 pulses of Stop_Vtempcnt.

As illustrated in FIG. 2, START is asserted at time t0. Vtemp_ramp1 and Vtemp_ramp2 are alternately enabled with a pulse being generated on Stop_Vtempcnt each time the enabled ramp reaches Vtemp. At time t1, 32 pulses of Stop_Vtempcnt have been detected by counter 54 and therefore START is negated (i.e. de-asserted). The output, Vtempcnt, of counter 54 provides the number of 24MClk pulses which occurred during the time period t1-t0. This value (due to the fact that the 24MClk is accurate) provides the time duration of 32 ramp-ups from 0 to Vtemp. Therefore, digital counter 54 provides a digital output value (Vtempcnt) in response to an input temperature dependent voltage (Vtemp). With each ramp having a known slope (the calibration of which will be described below), the digital outputs of counter 54 each correspond to a sensed temperature value. Therefore, a relationship can be set up between the temperature and the digital output of counter 54. In this manner, a lookup table or a mathematical formula can be used to convert the digital output of counter 54 to provide the corresponding sensed temperature.

Figure 3:
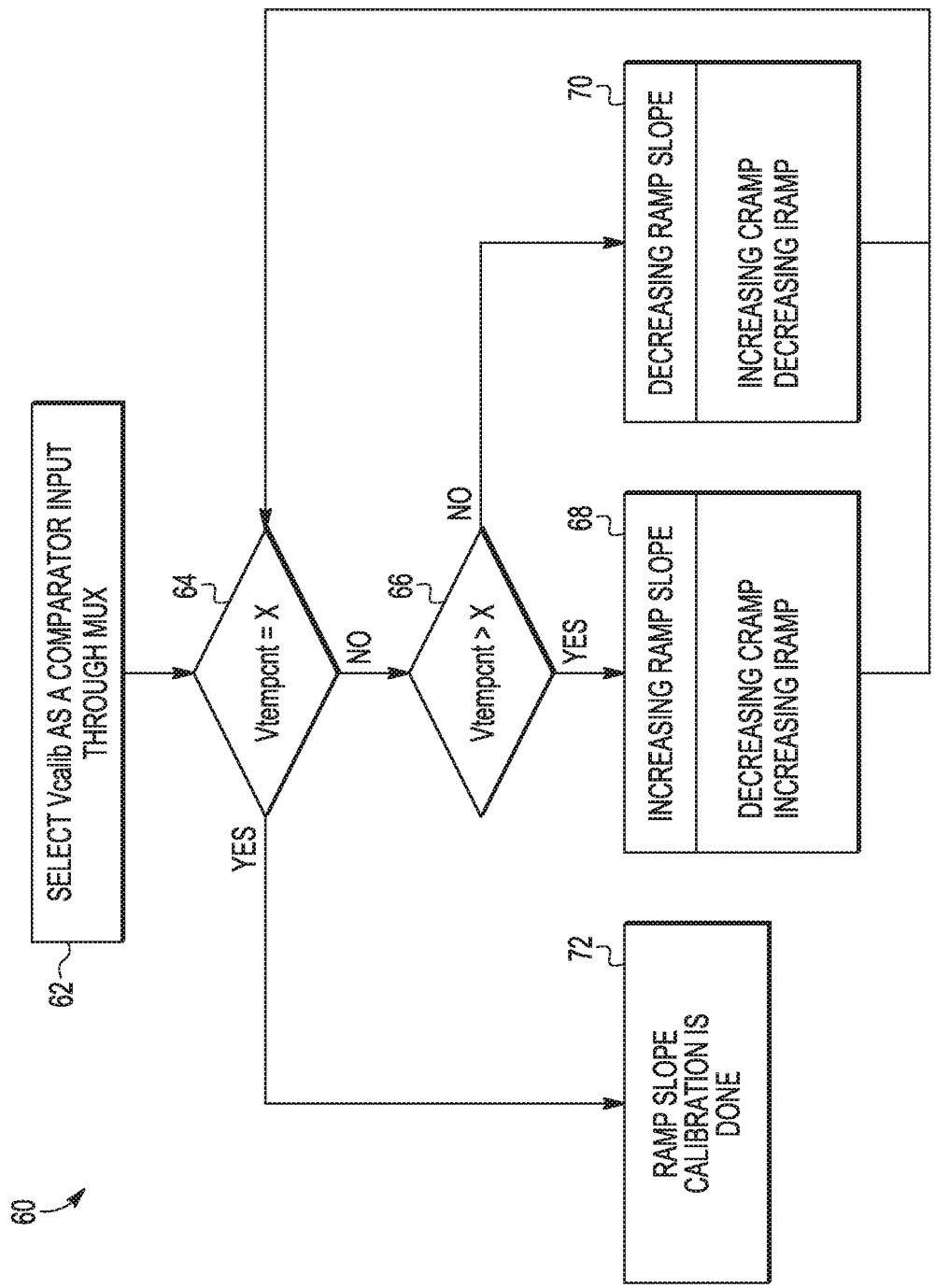
FIG. 3 illustrates, in flow diagram form, a method for calibration of the temperature sensor of FIG. 1, in accordance with one embodiment of the present invention.

During calibration by temperature sensing circuit 10, the slope of the ramps are set by testing against a known test voltage at a predetermined temperature and adjusting Cramp (the capacitance of each programmable capacitor 30 and 36) and Iramp until the output of counter 54, Vtempcnt, matches a number of 24MClk cycles for the test voltage at the predetermined temperature. FIG. 3 illustrates a method 60 of calibrating the ramp slopes in accordance with one embodiment of the present invention. Method 60 begins with block 62 in which a calibration voltage (Vcalib) is selected by MUX 38 (during the calibration phase) as the voltage provided to the non-inverting inputs of comparators 40 and 44. In one embodiment, Vcalib can be provided by an on-chip power supply. With Vcalib selected, temperature sensing circuit 10 is allowed to operate by asserting START and, after 32 pulses of Stop_Vtempcnt, provides Vtempcnt. Method 60 proceeds to decision diamond 64 in which it is determined whether Vtempcnt is equal to x. Note that x represents the number of 24MClk cycles expected for the test voltage at 25 degrees Celsius. Alternatively, x can be selected to represent the number of 24MClk cycles (or other clock cycles) for the test voltage at a different temperature. If Vtempcnt does not equal x, method 60 proceeds to decision diamond 66.

If Vtempcnt is greater than x, the ramp slope of Vtemp_ramp1 and Vtemp_ramp2 is increased (block 68) by decreasing the capacitance of programmable capacitors 30 and 36, increasing Iramp1 and Iramp2 by adjusting Vbias, or both. If Vtempcnt is less than x, the ramp slope of Vtemp_ramp1 and Vtemp_ramp2 is decreased (block 70) by increasing the capacitance of programmable capacitors 30 and 36, decreasing Iramp1 and Iramp2 by adjusting Vbias, or both. After the adjustments have been made to increase or decrease the ramp slope, temperature sensing circuit 10 operates again by asserting START (with Vcalib still selected by MUX 38). Again, Vtempcnt is checked against x at diamond 64. Method 60 continues, adjusting the ramp slopes as needed, until Vtempcnt matches x. When they match, calibration is complete (block 72) and the values of capacitors 30 and 36 and Iramp1 and Iramp2 have been properly selected. Therefore, the ramp slopes are calibrated such that when Vtempcnt matches x, the voltage Vcalib is indicated. With this information, a relationship can be set up between the sensed temperature dependent voltage Vtemp and the digital output of counter 54.

Therefore, by now it can be appreciated how a temperature sensor provides a digital value indicative of the sensed temperature using alternating twin $1^{st}$-order temperature independent single slope ramp voltage references and a digital counter. This scheme allows for accurate temperature sensing with slower clocks (e.g. a clock slower than few hundreds of MHz, or slower than 300 MHz). Further, the calibration scheme which allows for adjusting the programmable capacitance and currents to calibrate the ramp slopes help remove error under PVT variations.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also for example, in one embodiment, the illustrated elements of system 10 are circuitry located on a single integrated circuit or within a same device. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the alternating twin slope ramps may be generated by different circuitry and the comparison circuitry may include different or additional circuitry to perform the comparisons with the ramps and to generate the pulses. Additionally, different type counters may be used to implement the functionality of the digital counter. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a temperature sensor includes ramp generation circuitry including: a first tunable capacitor; a second tunable capacitor; a first current source coupled to the first tunable capacitor; a second current source coupled to the second tunable capacitor; a first switch configured to couple the first tunable capacitor to: discharge during a first phase of operation, and charge during a second phase of operation; a second switch configured to couple the second tunable capacitor to: charge during the first phase of operation, and discharge during the second phase of operation; a first node coupled between the first current source and a first terminal of the first tunable capacitor; and a second node coupled between the second current source and a first terminal of the second tunable capacitor. The temperature sensor also includes pulse generation circuitry including: a first comparator including a first input coupled to a first ramp voltage at the first node, a second input couplable to a calibration voltage during a calibration phase and to a temperature dependent voltage during an operational phase, and an output coupled to an input of digital counter circuitry; and a second comparator including a first input coupled to a second ramp voltage at the second node, a second input couplable to the calibration voltage during the calibration phase and to the temperature dependent voltage during the operational phase, and an output coupled to the input of the digital counter circuitry. In one aspect, the digital counter circuitry includes: a clock input; a start input; a stop input coupled to an output of the pulse generation circuitry; a first ramp start output; a second ramp start output; and a temperature dependent count output. In a further aspect, the temperature sensor further includes a logic gate having a first input coupled to the output of the first comparator, a second input coupled to the output of the second comparator, and an output coupled to the stop input of the digital counter circuitry. In another aspect of the above embodiment, the ramp generation circuitry further includes a start switch having a first current electrode coupled to a supply voltage, a second current electrode coupled to a bias voltage and a gate electrode coupled to a start signal, wherein the start switch is configured to enable the bias voltage to be applied to a control gate of a transistor in the first current source and a control gate of a transistor in the second current source. In a further aspect, the transistor in the first current source includes a first current electrode coupled to the supply voltage and a second current electrode coupled to a first current electrode of a first transistor in the first switch; the transistor in the second current source includes a first current electrode coupled to the supply voltage and a second current electrode coupled to a first current electrode of a first transistor in the second switch; the first transistor in the first switch includes a second current electrode coupled to the first node and a control gate coupled to a complement of a first ramp start signal; and the first transistor in the second switch includes a second current electrode coupled to the second node and a control gate coupled to a complement of a second ramp start signal. In yet a further aspect, the ramp generation circuitry further includes a first capacitive element having a first terminal coupled to the first node and a second terminal coupled to ground; and a second capacitive element having a first terminal coupled to the second node and a second terminal coupled to ground. In yet another aspect of the above embodiment, the second transistor in the first switch is an N-channel transistor that includes a first current electrode coupled to the first node, a second current electrode coupled to ground and a gate electrode coupled to a complement of a first ramp start signal; and the second transistor in the second switch is an N-channel transistor that includes a first current electrode coupled to the second node, a second current electrode coupled to ground and a gate electrode coupled to a complement of a second ramp start signal. In another further aspect, the transistor in the first current source, the transistor in the second current source, the first transistor in the first switch, the first transistor in the second switch, and the start switch are P-channel transistors. In yet another aspect of the above embodiment, during the calibration phase: the digital counter circuitry is configured to count a number of times the output of the pulse generation circuitry is asserted; the ramp generation circuitry is configured to adjust capacitance of the first tunable capacitor and the second tunable capacitor until the number of times the output of the pulse generation circuitry is asserted is equal to a predetermined number within a selected time period.

In another embodiment, a method of calibrating a temperature sensor includes, during a calibration phase of operation: when a counter value is not equal to a test counter value in a pulse generator circuit after applying an input calibration voltage to the pulse generator circuit and expiration of a predetermined number of pulse assertions by the pulse generation circuit: when the counter value is greater than the test counter value after a predetermined time period, decreasing capacitance of the temperature sensor, and when the counter value is less than the test counter value after the predetermined time period, increasing capacitance of the temperature sensor. In one aspect of the another embodiment, the decreasing and increasing capacitance of the temperature sensor includes adjusting a first variable capacitor and a second variable capacitor in the temperature sensor. In a further aspect, the calibration phase ends when the counter value is equal to the test counter value. In another aspect, the method further includes comparing an input calibration voltage to a first ramp temperature voltage during a first portion of the calibration phase of operation; and asserting a first stop counting signal when the input calibration voltage is equal to the first ramp temperature voltage. In another aspect, the method further includes comparing the input calibration voltage to a second ramp temperature voltage during a second portion of the calibration phase of operation; and asserting a second stop counting signal when the input calibration voltage is equal to the second ramp temperature voltage. In another aspect, the method further includes determining whether the counter value is not equal to the test counter value in the pulse generator circuit after the expiration of the predetermined number of pulse assertions. In yet another aspect, the method further includes generating the counter value including: asserting a first ramp start signal; when the first ramp start signal is asserted: de-asserting a second ramp start signal; increasing a first ramp signal; comparing the first ramp signal to a calibration signal; when the first ramp signal equals the calibration signal: asserting a stop signal; de-asserting the first ramp start signal, and asserting a second ramp start signal; when the second ramp start signal is asserted: increasing a second ramp signal; comparing the second ramp signal to the calibration signal; when the second ramp signal equals the calibration signal: asserting a stop signal; counting a number of assertions of the stop signal as the counter value.

In yet another embodiment, a temperature sensor includes controller circuitry configured to: alternate between a first portion and a second portion of a calibration phase with a first ramp start signal and a second ramp start signal; determine when a stop counting signal has been asserted a predetermined number of times in a pulse generation circuit; determine when a counter value in a counter circuit is not equal to a test counter value in the pulse generator circuit; and adjust capacitance of the temperature sensor until the counter value is equal to the test counter value. In one aspect of the yet another embodiment, the temperature sensor further includes a first comparator having a first input coupled to receive a calibration voltage and a second input coupled to receive a first ramp temperature voltage during the first portion of the calibration phase of operation; and a logic gate configured to assert a stop counting signal for a first time when the input calibration voltage is equal to the first ramp temperature voltage. In a further aspect, the temperature sensor further includes a second comparator having a first input coupled to receive the input calibration voltage and a second input coupled to receive a second ramp temperature voltage during the second portion of the calibration phase of operation; and the logic gate being further configured to assert the stop counting signal for a second time when the input calibration voltage is equal to the second ramp temperature voltage. In another aspect, the controller circuitry is further configured to: determine whether the counter value is not equal to the test counter value in pulse generator circuit after the stop signal is asserted after the predetermined number of times.

What is claimed is:

1. A temperature sensor comprising:
   ramp generation circuitry including:
      a first tunable capacitor;
      a second tunable capacitor;
      a first current source coupled to the first tunable capacitor;
      a second current source coupled to the second tunable capacitor;
      a first switch configured to couple the first tunable capacitor to:
         discharge during a first phase of operation, and
         charge during a second phase of operation;
      a second switch configured to couple the second tunable capacitor to:
         charge during the first phase of operation, and
         discharge during the second phase of operation;
      a first node coupled between the first current source and a first terminal of the first tunable capacitor;
      a second node coupled between the second current source and a first terminal of the second tunable capacitor;
   pulse generation circuitry including:
      a first comparator including a first input coupled to a first ramp voltage at the first node, a second input couplable to a calibration voltage during a calibration phase and to a temperature dependent voltage during an operational phase, and an output coupled to an input of digital counter circuitry;
      a second comparator including a first input coupled to a second ramp voltage at the second node, a second input couplable to the calibration voltage during the calibration phase and to the temperature dependent voltage during the operational phase, and an output coupled to the input of the digital counter circuitry.

2. The temperature sensor of claim 1, wherein:
   a second transistor in the first switch is an N-channel transistor that includes a first current electrode coupled to the first node, a second current electrode coupled to ground and a gate electrode coupled to a complement of a first ramp start signal; and
   a second transistor in the second switch is an N-channel transistor that includes a first current electrode coupled to the second node, a second current electrode coupled to ground and a gate electrode coupled to a complement of a second ramp start signal.

3. The temperature sensor of claim 1, wherein:
   during the calibration phase:
      the digital counter circuitry is configured to count a number of times the output of the pulse generation circuitry is asserted; and
      the ramp generation circuitry is configured to adjust capacitance of the first tunable capacitor and the second tunable capacitor until the number of times the output of the pulse generation circuitry is asserted is equal to a predetermined number within a selected time period.

4. The temperature sensor of claim 1, wherein the digital counter circuitry includes:
   a clock input;
   a start input;
   a stop input coupled to an output of the pulse generation circuitry;
   a first ramp start output;
   a second ramp start output; and
   a temperature dependent count output.

5. The temperature sensor of claim 4, further comprising:
   a logic gate having a first input coupled to the output of the first comparator, a second input coupled to the output of the second comparator, and an output coupled to the stop input of the digital counter circuitry.

6. The temperature sensor of claim 1, the ramp generation circuitry further comprising:
   a start switch having a first current electrode coupled to a supply voltage, a second current electrode coupled to a bias voltage and a gate electrode coupled to a start signal, wherein the start switch is configured to enable the bias voltage to be applied to a control gate of a transistor in the first current source and a control gate of a transistor in the second current source.

7. The temperature sensor of claim 6, wherein:
   the transistor in the first current source includes a first current electrode coupled to the supply voltage and a second current electrode coupled to a first current electrode of a first transistor in the first switch;

the transistor in the second current source includes a first current electrode coupled to the supply voltage and a second current electrode coupled to a first current electrode of a first transistor in the second switch;

the first transistor in the first switch includes a second current electrode coupled to the first node and a control gate coupled to a complement of a first ramp start signal;

the first transistor in the second switch includes a second current electrode coupled to the second node and a control gate coupled to a complement of a second ramp start signal.

8. The temperature sensor of claim 7, the ramp generation circuitry further comprising:
   a first capacitive element having a first terminal coupled to the first node and a second terminal coupled to ground;
   a second capacitive element having a first terminal coupled to the second node and a second terminal coupled to ground.

9. The temperature sensor of claim 7, wherein:
   the transistor in the first current source, the transistor in the second current source, the first transistor in the first switch, the first transistor in the second switch, and the start switch are P-channel transistors.

10. The temperature sensor of claim 7, wherein:
    a second transistor in the first switch is an N-channel transistor that includes a first current electrode coupled to the first node, a second current electrode coupled to ground and a gate electrode coupled to a complement of a first ramp start signal; and
    a second transistor in the second switch is an N-channel transistor that includes a first current electrode coupled to the second node, a second current electrode coupled to ground and a gate electrode coupled to a complement of a second ramp start signal.

11. A temperature sensor comprising:
    controller circuitry configured to:
    alternate between a first portion and a second portion of a calibration phase, in which, for each first portion of the calibration phase, a first ramp start signal is asserted to enable a first ramp voltage and, for each second portion of the calibration phase, a second ramp start signal is asserted to enable a second ramp voltage;
    determine when a stop counting signal has been asserted a predetermined number of times in a pulse generation circuit, wherein the stop counting signal is asserted each time the first ramp voltage or the second ramp voltage reaches a calibration voltage;
    in response to the stop counting signal being asserted the predetermined number of times, determine that a counter value in a counter circuit is not equal to a test counter value in the pulse generator circuit; and
    adjust capacitance of the temperature sensor until the counter value is equal to the test counter value.

12. The temperature sensor of claim 11, further comprising:
    a first comparator having a first input coupled to receive the calibration voltage and a second input coupled to receive the first ramp voltage during the first portion of the calibration phase; and
    a logic gate configured to assert the stop counting signal for a first time when the calibration voltage is equal to the first ramp voltage.

13. The temperature sensor of claim 12, further comprising:
    a second comparator having a first input coupled to receive the calibration voltage and a second input coupled to receive the second ramp voltage during the second portion of the calibration phase; and
    the logic gate being further configured to assert the stop counting signal for a second time when the calibration voltage is equal to the second ramp voltage.

* * * * *